US008172173B2

(12) United States Patent
Carlson (10) Patent No.: US 8,172,173 B2
(45) Date of Patent: May 8, 2012

(54) COVERT SENSOR EMPLACEMENT USING AUTOROTATIONAL DELIVERY MECHANISM

(75) Inventor: Mark A. Carlson, Amherst, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 345 days.

(21) Appl. No.: 12/436,203

(22) Filed: May 6, 2009

(65) Prior Publication Data

US 2009/0218439 A1 Sep. 3, 2009

Related U.S. Application Data

(63) Continuation-in-part of application No. 12/082,371, filed on Apr. 9, 2008, now abandoned.

(60) Provisional application No. 60/922,458, filed on Apr. 9, 2007.

(51) Int. Cl.
*B64C 27/00* (2006.01)
(52) U.S. Cl. ............... 244/17.11; 244/17.23; 244/138 A
(58) Field of Classification Search ............... 244/17.11, 244/17.1, 17.17, 138, 150, 175, 49, 17.23, 244/114 R
See application file for complete search history.

(56) References Cited

U.S. PATENT DOCUMENTS

| | | | | |
|---|---|---|---|---|
| 2,486,059 A * | 10/1949 | Pentecost | ...................... | 416/115 |
| 3,948,467 A * | 4/1976 | Krusius | ...................... | 244/116 |
| 5,413,514 A * | 5/1995 | Milligan | ...................... | 446/36 |
| 5,947,419 A * | 9/1999 | Warren et al. | ............. | 244/138 A |
| 6,055,477 A * | 4/2000 | McBurney et al. | ........... | 701/207 |
| 6,164,594 A * | 12/2000 | Pignol et al. | ............. | 244/138 A |
| 6,216,065 B1 * | 4/2001 | Hall et al. | ...................... | 701/16 |
| 6,347,764 B1 * | 2/2002 | Brandon et al. | ........... | 244/17.11 |
| 6,373,521 B1 * | 4/2002 | Carter | ......................... | 348/144 |
| 6,712,317 B1 * | 3/2004 | Warren et al. | ............. | 244/138 R |
| 7,178,761 B2 * | 2/2007 | Wada et al. | ............. | 244/138 R |
| 7,631,834 B1 * | 12/2009 | Johnson et al. | ........... | 244/17.17 |
| 7,732,741 B1 * | 6/2010 | Whitham | ..................... | 244/3.27 |
| 2003/0164423 A1 * | 9/2003 | Courtois et al. | ......... | 244/102 R |
| 2004/0051006 A1 * | 3/2004 | Warren et al. | ............. | 244/138 R |
| 2005/0051667 A1 * | 3/2005 | Arlton et al. | ............. | 244/17.11 |
| 2005/0258304 A1 * | 11/2005 | Dammar | ..................... | 244/17.11 |
| 2007/0095976 A1 * | 5/2007 | Bietenhader | ............. | 244/102 A |
| 2008/0237396 A1 * | 10/2008 | Bietenhader | ............. | 244/102 A |
| 2010/0025526 A1 * | 2/2010 | Lawrence | ................. | 244/17.23 |
| 2010/0228406 A1 * | 9/2010 | Hamke et al. | ..................... | 701/3 |
| 2010/0282897 A1 * | 11/2010 | de la Torre | ..................... | 244/49 |
| 2011/0006166 A1 * | 1/2011 | Arlton et al. | ................. | 244/7 A |

OTHER PUBLICATIONS

Leishman, J. Gordon, "Development of the Autogiro: A Technical Perspective," Journal of Aircraft, vol. 41, No. 4, Jul.-Aug. 2004, pp. 765-781.
Young, Larry, et al., "Rotary-Wing Decelerators for Probe Descent Through the Atmosphere of Venus," 2nd International Planetary Probe Workshop, Nasa Ames Research Center, Moffett Field CA, Aug. 23-27, 2004.

(Continued)

*Primary Examiner* — Joshua J Michener
*Assistant Examiner* — Medhat Badawi
(74) *Attorney, Agent, or Firm* — Daniel J. Long; Robert K. Tendler (57) ABSTRACT

A method for emplacing sensors, comprising the steps of modifying an existing sensor to attach an autorotational mechanism and deploying said sensor by autorotational means.

7 Claims, 11 Drawing Sheets

OTHER PUBLICATIONS

Wheatley, John B., "An Aerodynamic Analysis of the Autogiro Rotor With a Comparison Between Calculated and Experimental Results," NACA TN Report No. 487, Jan. 17, 1934.

McCormick, Barnes W., "A Numerical Analysis of Autogiro Performance," AIAA 2002-5950, 2002 Biennial International Powered Lift Conference and Exhibit, Nov. 5-7, 2002, Williamsburg, Virginia, pp. 1-8.

Wheatley, John B., "Lift and Drag Characteristics and Gliding Performance of an Autogiro as Determined in Flight," NACA Report No. 434, May 2, 1932.

Wheatley, John B., "The Aerodynamic Analysis of the Gyroplane," NACA TN No. 492, Mar. 1934.

* cited by examiner

COVERT SENSOR EMPLACEMENT USING AUTOROTATIONAL DELIVERY MECHANISM

RELATED APPLICATIONS

This Application is a Continuation In Part and claims rights under 35 USC §120 from U.S. application Ser. No. 12/082,371 filed Apr. 9, 2008, which claims rights under 35 USC §119(e) from Provisional Application 60/922,458 filed Apr. 9, 2007, the contents of which are incorporated herein by reference.

FIELD OF THE INVENTION

The present invention relates to aeronautics and astronautics and, more particularly, to autorotational delivery means for sensor emplacement.

BACKGROUND OF THE INVENTION

High accuracy emplacement of fragile electronic sensor payloads for ground or sea monitoring is typically addressed utilizing either free fall or parachute-deployed systems. Unfortunately, both of these approaches have serious drawbacks relating to accuracy in the case of the parachute delivery approach and high impact loads in the case of the free fall technique. Furthermore, while it is possible to address specific environmental constraints such as winds aloft under certain conditions, both of the existing systems suffer from accuracy susceptibility due to limited control authority or lack of apriori information. Finally, in the case of the parachute system, two additional drawbacks are hang time, which optically exposes the payload and delivery vehicle to unwanted scrutiny for long periods of time, and the physical size of the deployment mechanism required to ensure emplacement of the payload. Additional post deployment issues with observability of a large parachute canopy further spoil observability.

A need, therefore, exists for an improved way of emplacing sensitive electronics without risking damage due to shock loads associated with impact and the need for a covert, autonomous, emplacement capability in the presence of strong external factors, such as environmental constraints, with extremely high accuracy, as well as post emplacement preservation of covert aspects of sensor operation.

More particularly, the problem in covertly emplacing relatively fragile sensors is the ability to air launch the sensors, have a controlled descent to limit their downward velocity and have them placed at a precise geophysical location which has been pre-targeted. It is important that the sensitive payload not impact the ground. This requirement for a soft landing eliminates the possibility of standard parachute deployment where the payload impacts the ground at some unknown velocity against some unknown surface where damage to the payload can occur.

It is noted that the payloads envisioned are very sensitive sensors, often employing sensitive imaging cameras or radars, which are subject to damage during parachuting or dead-dropping.

The problem with dead-dropping of payloads is also that the accuracies involved are minimal. If one does not know where the payload is going to land within a mile of the target due to winds aloft, then precision emplacement is impossible.

Note that when a payload is dropped using a parachute it hits with some terminal velocity that is not necessarily controlled and does not necessarily result in the payload landing right side up. Note also that whatever the terminal velocity is, it can damage relatively fragile sensors so that if a rock is hit at high speed there is a substantial risk of damaging the sensitive radar, optical device or other sensor.

Moreover, it is important to be able to deploy payloads as high as 40,000 or as low as 40 feet. There is therefore a necessity to provide a payload velocity limiting system that can deploy quickly from the payload over a wide range of altitudes. For instance, one needs to have enough altitude to perform a precision drop and have the payload emplaced exactly on a predetermined spot. Moreover, there needs to be enough altitude to be able to determine the geophysical location of the payload, having preloaded the target's location, and to be able to solve the guidance problem to develop an optimum trajectory for the payload to travel in order to be precisely emplaced.

Additionally, for low or minimum altitudes one needs to provide almost instantaneous deceleration of the payload and almost instantaneous trajectory control. For higher altitudes, one may wish to delay deployment of the decelerating device to let the payload freefall in the general vicinity of the target location until it gets to a so-called deployment basket where one can deploy deceleration and activate guidance. At the point that the deceleration mechanism is deployed it would be desirable to instantly calculate the optimum trajectory to route the payload to the target.

Moreover, when the payload is sufficiently close to the landing point it would be desirable to brake the descent of the payload, and to level the payload so as to protect the sensitive sensors and to provide for optimal sensor orientation.

Thus, it is important to provide payload descents which provide for a soft landing and to provide for the ability to adjust the sensor when landing on an uneven, rocky terrain.

In summary, it is important to provide a sensor delivery system which is covert and has an acoustically low signature as well as a low radar cross section, and that is faster than using a parachute and considerably more controllable than a parachute so that the payload is gently delivered to the exact target spot in the ground, the minimal observability, both in flight and post landing, by limiting the time that the payload descents, with a brake provided to limit impact velocity.

SUMMARY OF THE INVENTION

The system of the present invention solves the emplacement problem with a low-cost, silent configuration that can be adapted to precisely and silently launch any size payload or dispenser and guide it to a soft touchdown at a precise target locality. The subject system accomplishes those goals by deploying sensors on an autogiro that controls the descent to be along a calculated optimum trajectory. The system relies on the autorotational principle embodied in traditional helicopter design and merges those techniques with low-cost manufacturing and low radar cross-section materials to provide a sensor delivery system that is deployable at a variety of altitudes, has a GPS engine to provide instantaneous payload location, calculates the trajectory to a target location from the GPS-derived location, and uses an autogiro autopilot to control the descent of the payload to guide the payload along the trajectory to a precise, soft landing.

More particularly, the subject invention incorporates a covert acoustically muted system of emplacing sensors at a predetermined target location by deploying the sensor from a height above the target area and controlling its descent while at the same time steering the sensor to the target. This is accompanied by utilizing a GPS or other location determining engine at the sensor payload vehicle to ascertain where the payload is when deployed, and to monitor its trajectory toward a pre-entered target coordinate, with an onboard navigation unit calculating an optimal trajectory based on pre-release conditions, and guiding the payload post-release along the optimal trajectory. Realtime location is provided to the navigation unit that includes an autopilot. In one embodiment, the deceleration of the payload is provided by the autogiro autorotational delivery mechanism that involves a free wheeling rotor with blades controlled by the autopilot to guide the payload to the intended target. In one embodiment, the autogiro is controlled by an autopilot copied to a GPS receiver to provide an optimal payload trajectory, with the autogiro mechanism acting like an unpowered helicopter in an autorotation mode, thus to accurately emplace the sensors and to minimize damage during landing.

In one embodiment, a shock absorbing articulated four footed quadropod assembly cushion is used to support and to automatically reposition the sensor payload with respect to the terrain to which it has landed.

BRIEF DESCRIPTION OF THE DRAWINGS

These and other features of the subject invention will be better understood in conjunction with the Detailed Description in connection with the Drawings of which:

FIG. 10 is a bottom view of the module of FIGS. 1 and 2 showing the pins, quadropod assembly and centrally located sensor assembly; and, FIG. 11 is a diagrammatic illustration of the mechanical actuation and attachment of the blades of the autocopter module showing a swash plate and various hinged joints and actuating members to control the angle of attack of the blades and other blade parameters, thus to be able to guide the descending sensor module to the ground along a predetermined trajectory to a soft landing.

DETAILED DESCRIPTION

Referring to FIGS. 1-11, the mechanism of the present invention is a simple modification kit for existing sensors or can be readily incorporated into new sensor payloads to enable heretofore unattainable, precision emplacement of the sensor device at extremely low risk of damage due to high landing loads. The device consists of a guidance and control assembly and mechanical swash plate assembly with attendant rotor blades. The blades are attached in a conventional manner, incorporating a fully articulating hinge. Both cyclic and collective control is provided, enabling a full range of dive speed and directional control to be accommodated. The control is provided via the autogiro navigation and control algorithm hosted in the master processor contained within the electronics module segment of the device. The system navigation approach utilizes GPS techniques with an inertial capability for operation in GPS-denied areas. The blades stow along the longitudinal axis of the payload and are deployed upon release from the canister, or in an alternative embodiment, using a timing mechanism to effect better separation from the carriage vehicle. The swash plate assembly incorporates materials and manufacturing techniques tailored to low cost and high mechanical reliability. The rotor blades are of unique section configuration tailored to the specific flight envelope of the device. The autocopter modification kit is compatible with both fixed- and rotary-wing platforms.

Those skilled in the art will appreciate that the mechanism of the present invention solves the precision emplacement problem via a controllable rotor. High accuracy is possible through the use of a suitable control algorithm inertial sensors for guidance, and sufficient control authority provided by the rotor. It solves impact load problems via soft landing provided by the autorotation flight mode. It provides a covert method of sensor emplacement with the acoustic signature of the autogiro being extremely low; with the form factor being significantly smaller than a comparable parachute; and RCS, with the radar cross section being controlled via material selection and geometric shaping. The entire package is compatible with existing dispenser form factors and can be deployed in a similar manner as ordinary existing payloads.

The following describes known techniques for auto copter control:

Leishman, Gordon J., "Development of the Autogiro: A Technical Perspective," Journal of Aircraft, Vol. 41, No. 4, July-August 2004.

Young, Larry A.; Briggs, Geoffrey; Aiken, Edwin, Pisanich, "Rotary-Wing Decelerators For Probe Descent Through the Atmosphere of Venus," 2$^{nd}$ International Planetary Probe Workshop, NASA Ames Research Center, Moffett Field Calif., Aug. 23-27, 2004.

Wheatley, John B., "An Aerodynamic Analysis Of the Autogiro Rotor With a Comparison Between Calculated and Experimental Results," NACA TN No. 487, Jan. 17, 1934.

McCormick, Barnes W., "A Numerical Analysis Of Autogiro Performance," AIAA 2002-5950, 2002 Biennial International Powered Lift Conference and Exhibit, 5-7 Nov. 2002, Williamsburg, Va.

Wheatley, John B., "Lift and Drag Characteristics and Gliding Performance Of an Autogiro As Determined In Flight," NACA Report N. 434, May 2, 1932.

Wheatley, John B., "The Aerodynamic Analysis of the Gyroplane," NACA TN No. 492, March, 1934.

Figure 1:
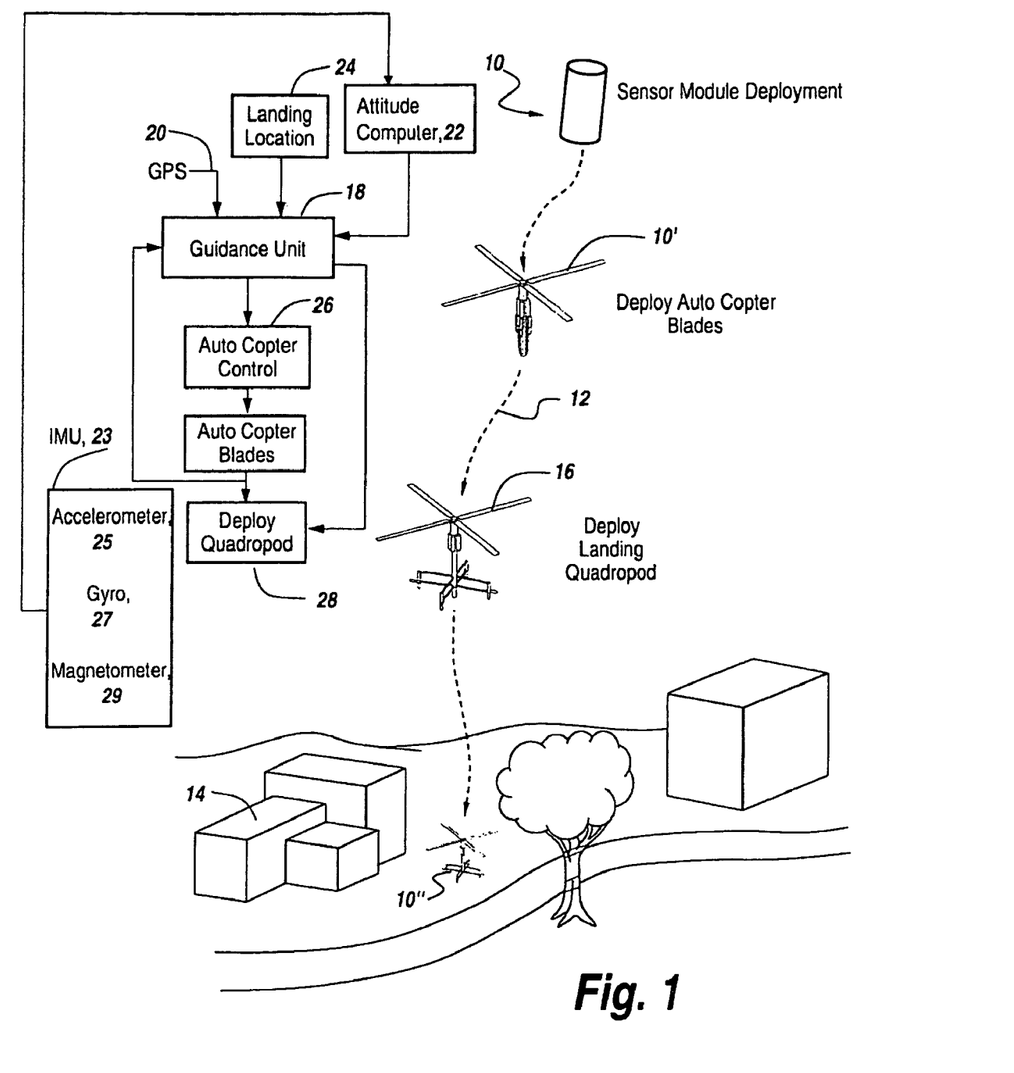
FIG. 1 is a diagrammatic illustration of sensor module deployment utilizing an autocopter autorotation mechanism descent control for guiding the deployed sensor module along a trajectory toward preloaded coordinates of a target at which the sensor is to be emplaced.

Referring now to FIG. 1, what is shown is the deployment of a sensor module 10 with autogiro or autocopter blades and landing apparatus stowed. After the deployment of the module, as illustrated at 10', the autocopter blades extend out and the module descends along an optimal trajectory 12 to a point above the surface of the earth 14 at which multi-footed landing apparatus 16 is deployed. In one embodiment the multi-footed landing apparatus includes a assembly with four feet and shock absorbing articulated arms and sensor leveling capabilities, such that when the sensor module lands, as illustrated at 10", the sensor package carried by the module is positioned exactly at the target location with its sensors at the appropriate attitude for the particular sensing operation they are to perform. Sensor module 10 includes a guidance unit 18 having a OPS input 20, an attitude computer input 22, and an accelerometer/inertial navigation unit 23 input, with the unit consisting of a plurality of accelerometers 25, gyroscopes 27 and magnetometers 29, and with the preloaded landing location 24 also inputted to the guidance unit. The guidance unit is coupled to an autocopter control 26 in the form of an autopilot which positions the autocopter blades to guide the module along an optimal trajectory computed by the guidance unit. The guidance unit also is responsible for the deployment of the quadropod landing assembly as illustrated at 28.

It is noted that module 10 may be deployed from any height, for instance from 40,000 feet down to 40 feet. The advantage of the autocopter is that when it is deployed at a low altitude one can deploy the blades immediately and go into the autorotate mode. Thus, one needs to have enough altitude for a precision drop to make sure that the module lands exactly on the predetermined spot. One thus needs enough altitude for the sensors and modules to determine where it is and to determine where the target is relative to its position, thus to be able to solve guidance problems to develop the aforementioned optimum trajectory. Note that while one needs a minimum altitude, it can be a relatively low altitude in view of the autorotation delivery system described. It is noted that higher altitudes work just as well.

In the case that one has a higher altitude drop one can delay the deployment of the rotor blades and let the module fall in the general direction of the intended target until it reaches a so-called deployment basket where the autocopter blades are deployed from their stowed position. By the point that the blades are deployed the trajectory has been calculated and the route to the target specified, with the autocopter utilizing autorotational algorithms to limit the downward descent of the module and to guide it to the target. In one embodiment, the module has the aforementioned quadropod landing apparatus so that even with a relatively heavy sensor payload the articulated arms of the quadropod provide shock absorbing to prevent sensor damage when the module impacts the ground. Moreover, the fully articulated quadropod assembly provides the ability to adjust the sensors to an uneven terrain for appropriate leveling and sensor attitude adjustment. Thus, the subject module is designed to hit and self adjust as it goes down, with the leveling system inside the body of the module providing proper orientation of the sensors once the module has landed. Thus, if one has a camera and a particular view in mind, the camera may be registered to the terrain. This leveling provides for orientation critical missions where it's important to know exactly where the sensor is relative to the ground as well as its orientation.

The subject system provides a covert sensor delivery system that offers minimum observability while at the same time limiting the impact velocity for a soft landing.

It is noted that the autocopter design is an autogiro operating like an unpowered helicopter using the autorotation principal.

The autorotation principal involves the physics that when a device is falling, air rushing up through the blades causes the blades to spin. When the blades spin they create a lift vector which is opposing the fall. Eventually an equilibrium is established where one ends up with a constant downward velocity. By control of the autocopter blades one achieves a very gentle, controllable descent and with the appropriate autopilot is possible to guide the module and steer it like a helicopter to control its lateral direction as well as descent speed.

The blade configuration depends upon wind tunnel data or experimental data on the lift coefficient of the blades, the drag coefficient of the body, the rate at which the blades are to rotate, and friction parameters between the rotor head and the body. The control of the autocopter blades involve an algorithm that is modeled after the algorithm for the modern helicopter, which takes into account the scenario when the engine fails and the helicopter goes into the autorotation mode.

Note that in the autorotation mode the blades rotate with respect to the body of the module and are separated by a joint very much like that used in a helicopter. A swash plate is utilized along with control rods that reciprocate the control rods are attached to the main rotor to adjust the pitch of the blades. The blade control includes control to the left, right, up and down. The autocopter is designed to minimize the friction between the rotor head assembly and the body to minimize the amount of coupling between the body and rotor head.

In one embodiment, the module has vanes on the quadropod arms to provide an amount of control area to counter to rotation of the blades.

Thus, the blades or fins provided on the outside of the package provide a torque which opposes the minimal amount of torque of the freely turning blade hub, with the fins or vanes counteracting frictional torque.

Figure 11:
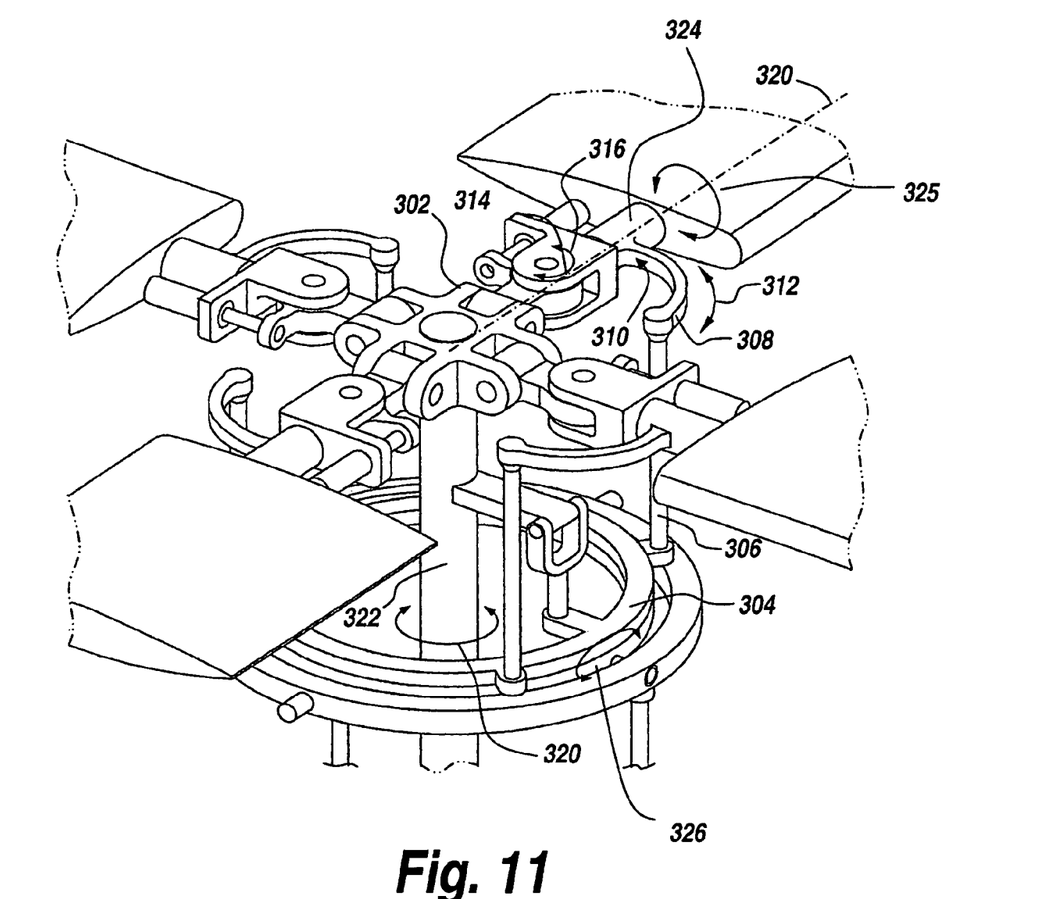

As will be seen in connection with FIG. 11, the swash plate assembly uses a so-called flapping hinge. The flapping hinge is described by reference character 302. When the hinges move vertically then the angle of effective diherdal of the blades is changed. The outboard hinges 324 control rotation of each blade in the pitch plane 325, which sets the angle of attack of each blade. The angle of attack is set by adjusting the swash plate. Thus, as the swash plate rotates on a cam, the push prod rocks an inner ring up and down. The inner ring is shown in FIG. 11 at reference character 304, which rotates as indicated by the double-ended arrow, 326. The control rod is illustrated at reference character 306 and moves a control rod feature 308 as illustrated. Feature 308 controls rotational joint 310 which is to set the angle of attack of the blade that controls the lift and rate of descent. Note that feature 308 moves in the direction of double-ended arrow 312 to control the lead or lag of the blade. This is accomplished through the utilization of a lead or lag pivot 314 which is a restrained pivot. This means that the blade can move in the direction of double-ended arrow 316 in which the blade is allowed to rotate about axis 320.

Note the entire assembly is rotating about a main central shaft 322 rotating as illustrated by arrow 320. The assembly in FIG. 11 thus constitutes a fully articulated flapping hinge.

Figure 2:
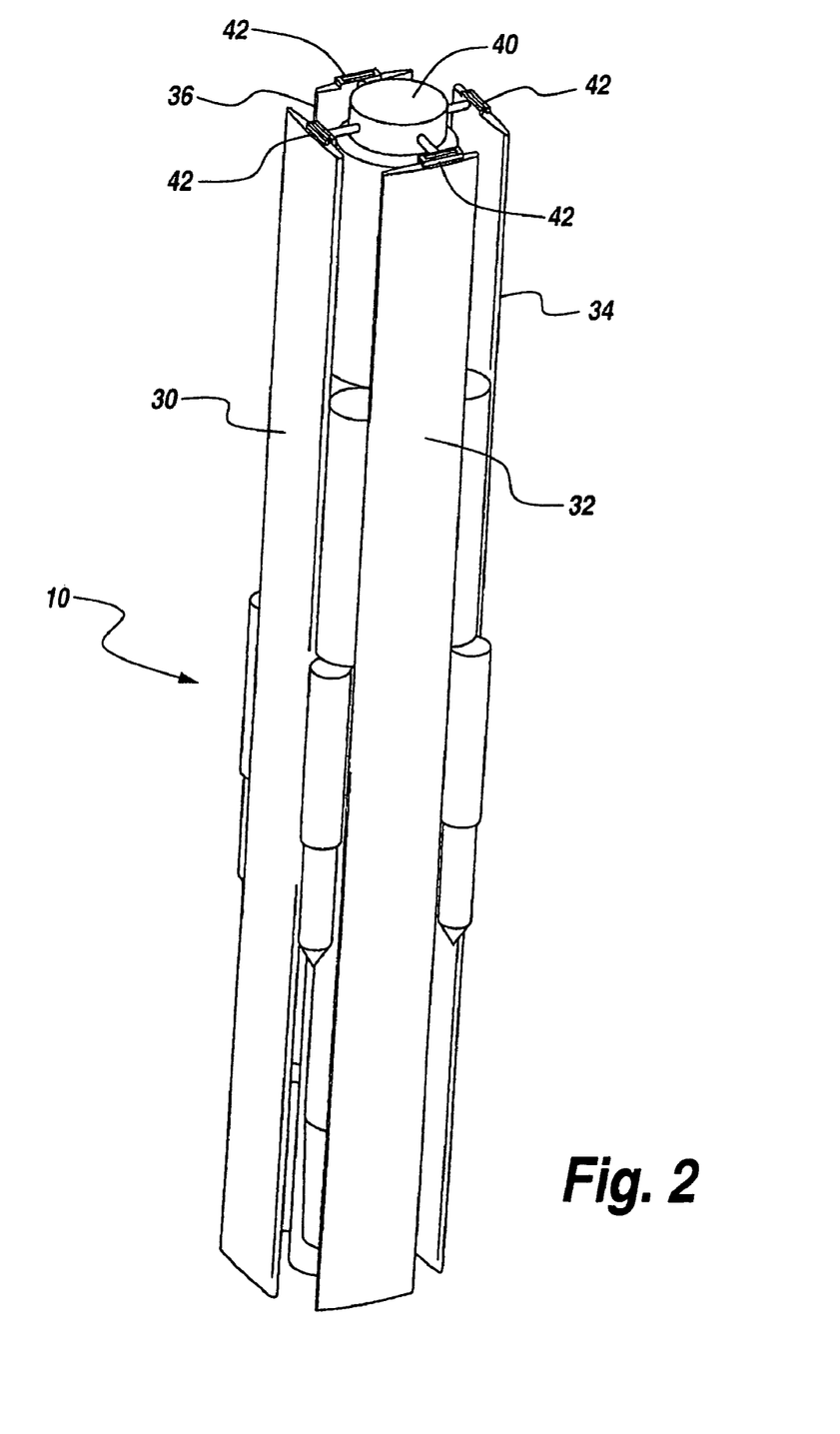
FIG. 2 is a diagrammatic illustration of the sensor deployment module of FIG. 1 in which the autocopter blades are stowed about the body of the module, also showing the stowed position of a four footed quadropod landing assembly for the support of the module upon landing.
Figure 3:
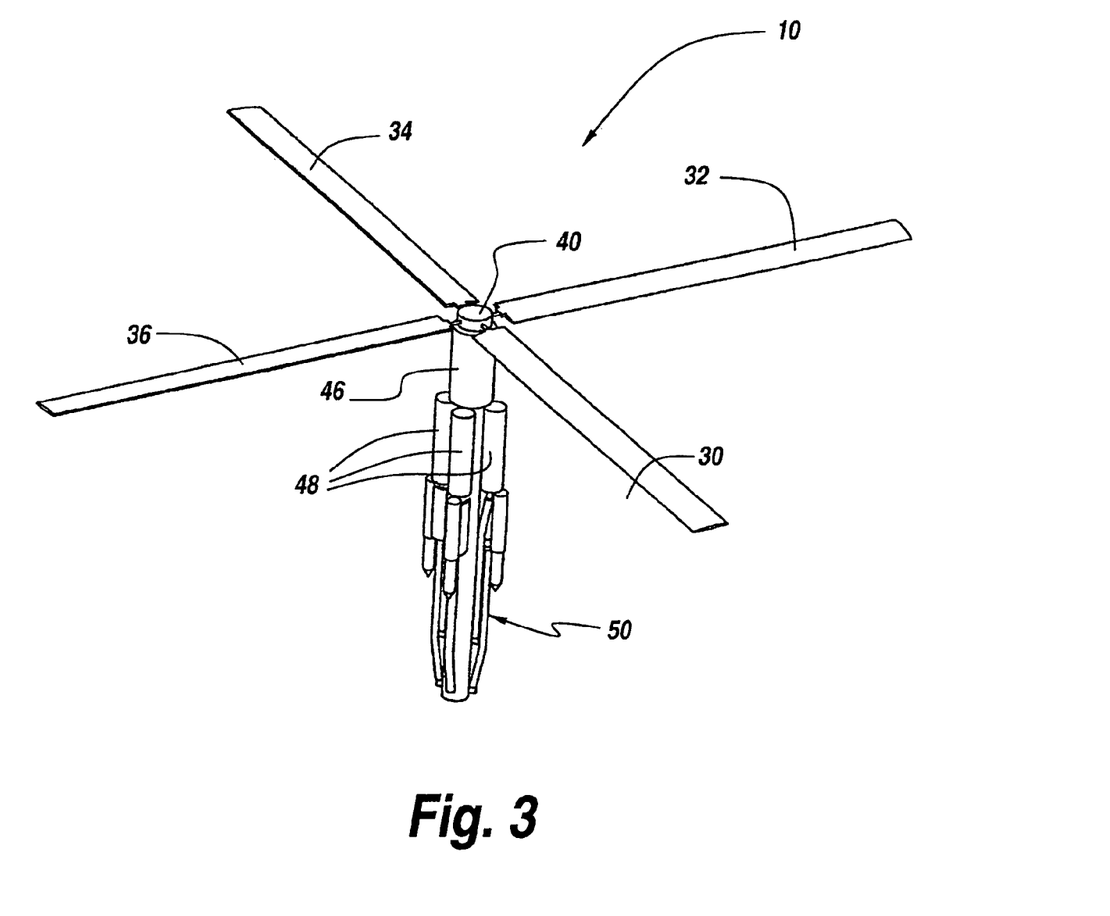
FIG. 3 is a diagrammatic illustration of the sensor deployment module of FIGS. 1 and 2 showing the extension of the rotor blades at the top of the module, with the quadropod assembly collapsed along the sides of the module.

Referring now to FIG. 2, in one embodiment the sensor module 10 has four blades showed in stowed position, namely blades 30, 32, 34, and 36. These blades are attached to a hub 40, such that when deployed on hinges 42 extend outwardly as shown in FIG. 3. Here hub 40 is attached to module housing 46. Mounted on housing 46 are payload canisters 48, with the lower portion of module 10 carrying a collapsed and stowed four footed landing assembly 50.

Figure 4:
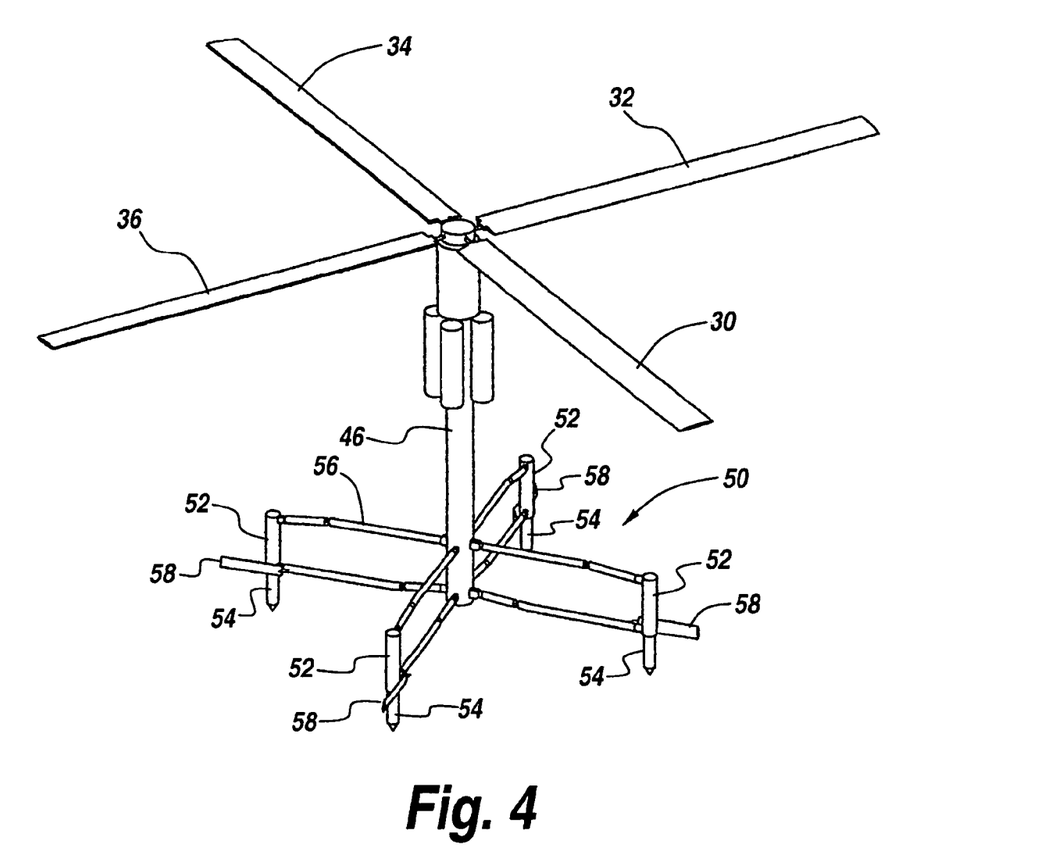
FIG. 4 is a diagrammatic illustration of the sensor deployment module of FIG. 3 illustrating the deployment of the quadropod landing assembly, showing an articulated assembly with pins extending from the assembly at the distal ends of articulated arms, also showing articulating stabilization fins or vanes which counter the rotation of the rotor blades.

As illustrated in FIG. 4, during descent, quadropod 50 has four feet 52 having ground engaging pins 54. In one embodiment the quadropod landing assembly involves an articulated parallelogram frame 54 such that upon deployment from the stowed position pins 42 are parallel to the module body 46 and are parallel to each other. Each of feet 52 optionally includes vanes 58 that are used to oppose the rotation of blades 30-36.

Figure 5:
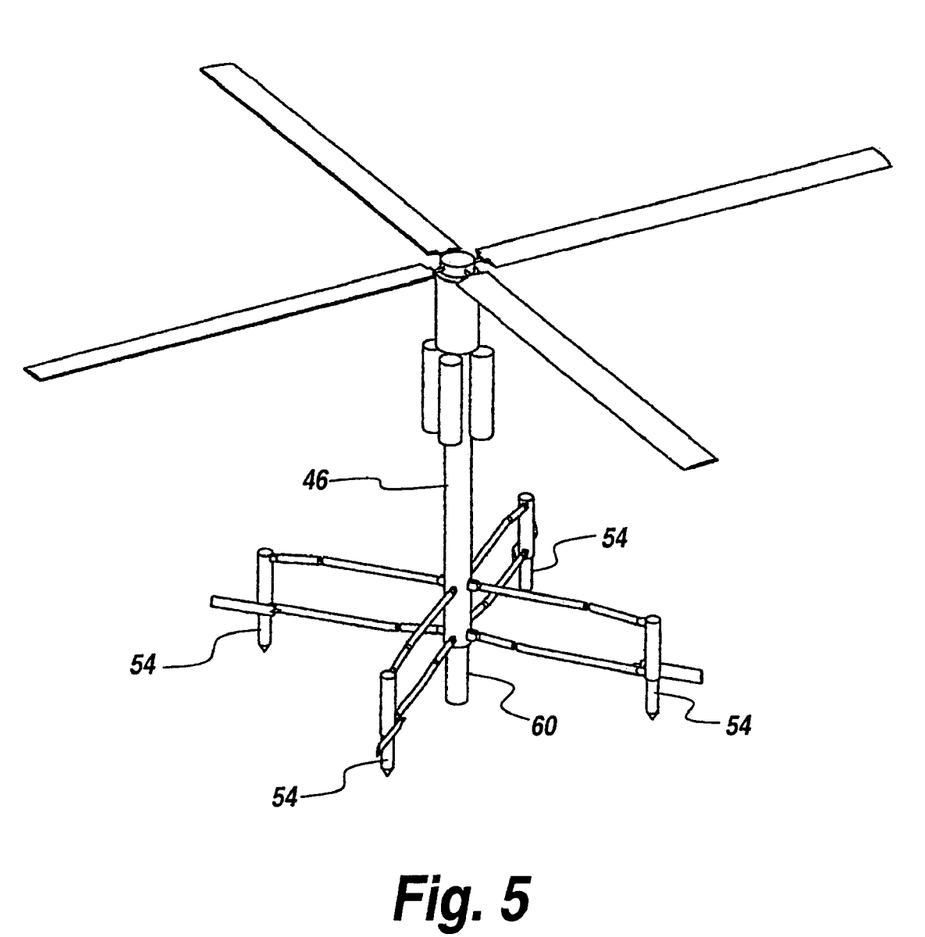
FIG. 5 is a diagrammatic illustration of the sensor module of FIG. 4 showing the extension of a sensor package below the sensor module body and located between the pins of the articulated quadropod.

Referring now to FIG. 5, what is shown is that extending from module body 46 is a canister 60 which extends between pins 54 of the articulated arm structure forming the landing apparatus. As a result, the sensor package is spaced precisely above the ground and is supported above the pins as illustrated.

Figure 6:
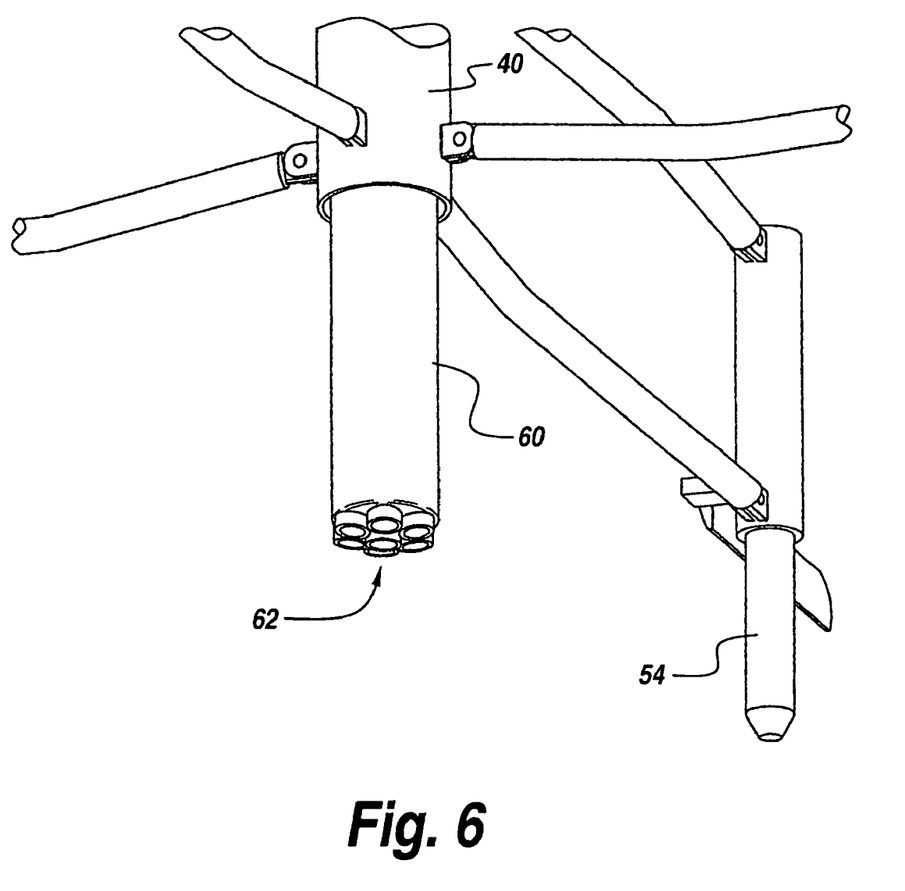
FIG. 6 is a diagrammatic illustration of the extension of the sensors carried within the module down from an outer module housing between the pins of the quadropod.

Referring to FIG. 6, canister 60 includes a number of individual sensors 62 carried within a canister that contains one or more sensors for a variety of different sensing missions.

Figure 7:
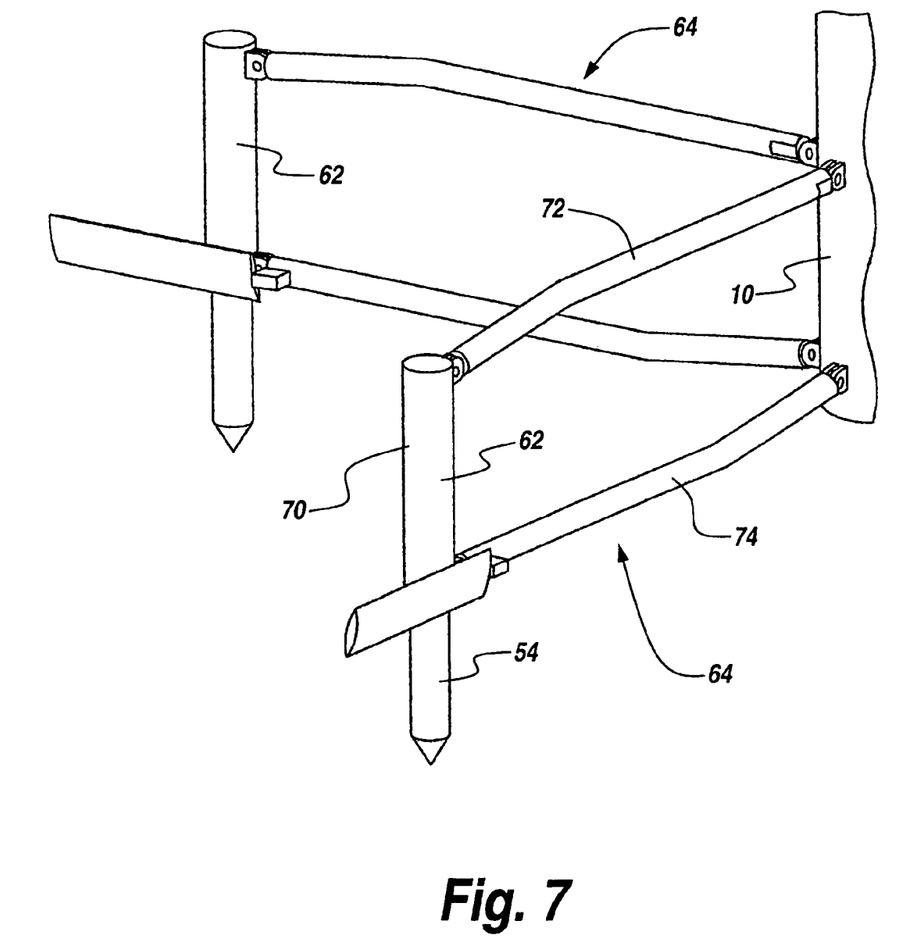
FIG. 7 is a diagrammatic illustration of a portion of the quadropod assembly of FIG. 5 illustrating a parallelogram arm configuration showing pivots at the four corners, also showing the laterally extending autorotation countering pins.

Referring to FIG. 7, what can be seen is that pins 54 are secured to tubes or rods 62 which form the distal ends of respective arms 64 of the articulated landing apparatus.

Here it can be seen that the parallelogram arm includes distal end 70, with parallel arms 72 and 74 hingedly attached to module 10.

Figure 8:
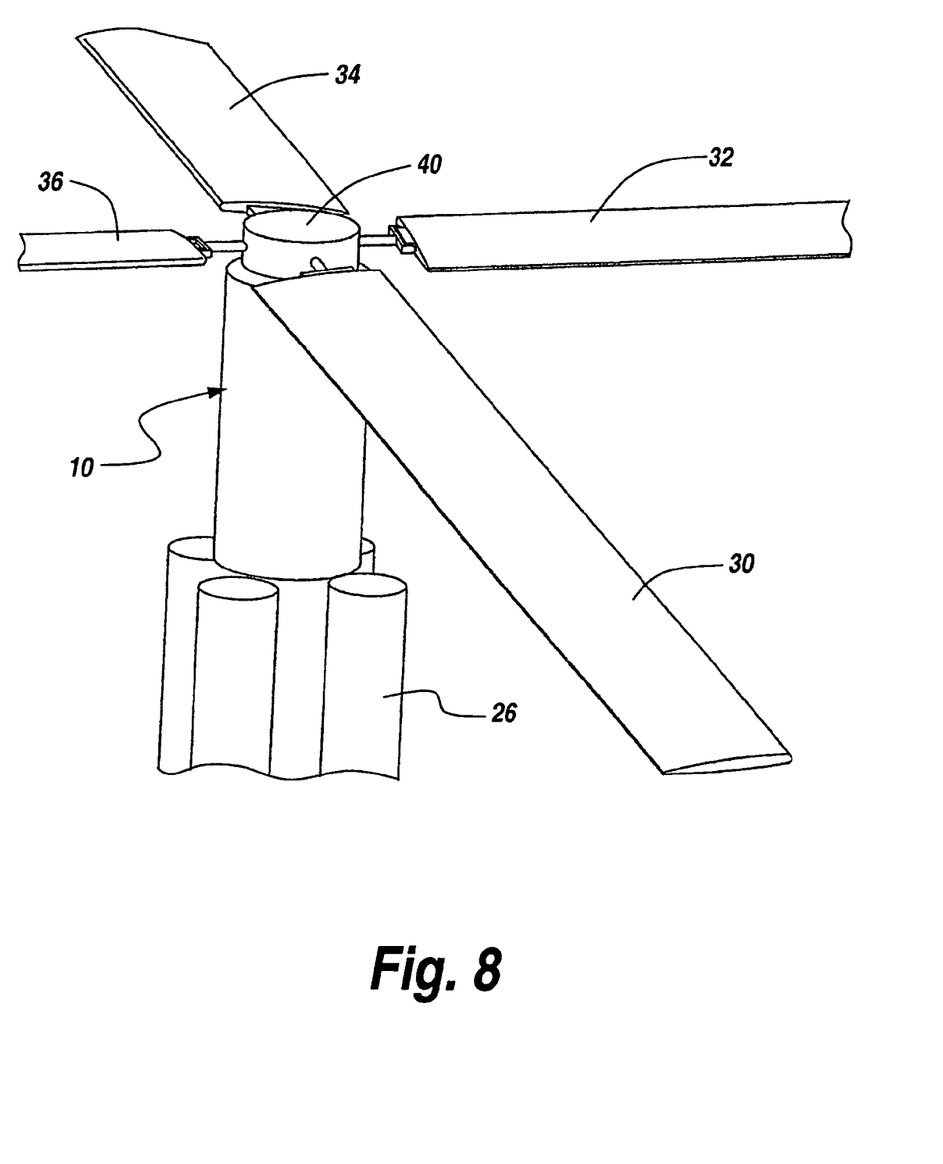
FIG. 8 is a diagrammatic illustration of the top portion of the module of FIGS. 1-7 illustrating the attachment of the rotor blades to a hub and swash plate located at the top portion of the module housing in which the swash plate freely rotates relative to the module housing.

As illustrated in FIG. 8, rotor blades 30-36 are carried on freely rotateable hub 40 which is mounted to module 10, such that the rotor assembly is freely rotateable with respect to the module body.

Figure 9:
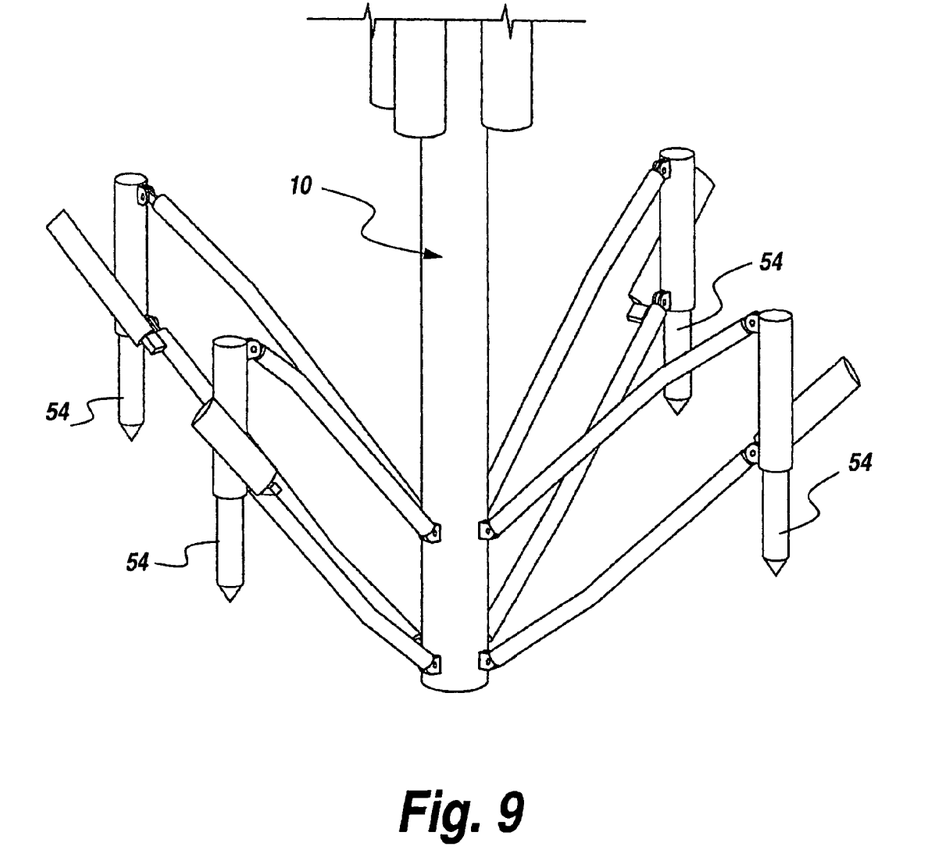
FIG. 9 is a diagrammatic illustration of the partial extension of the quadropod of FIG. 3 showing the parallel positioning of the pins and pin holding assemblies as the quadropod is deployed from its stowed position.

Referring now to FIG. 9, what can be seen is that the articulated landing assembly is shown partially deployed from module 10 such that pins 54 extend downwardly and in parallel one to the other during the deployment of the landing apparatus.

Figure 10:
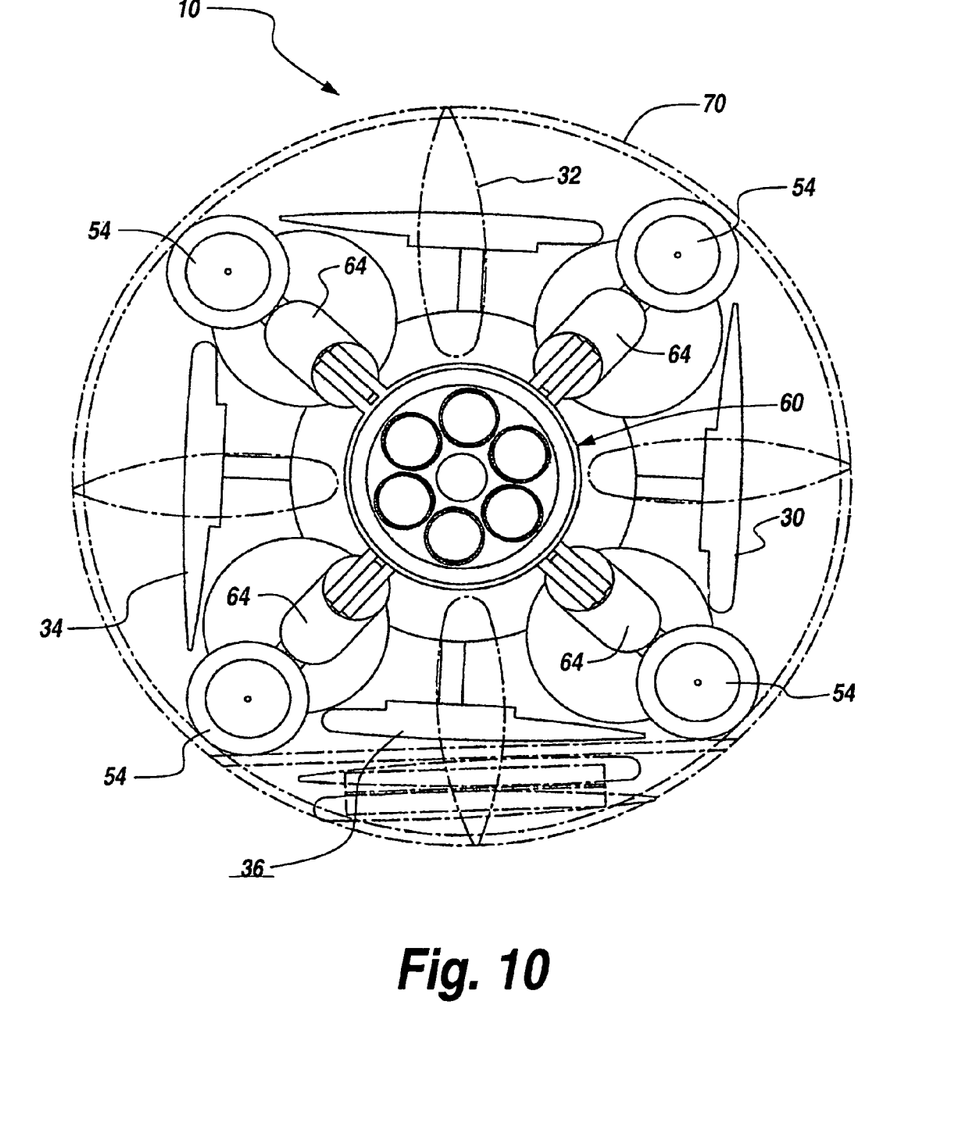

Referring to FIG. 10, what is shown is a bottom view of module 10 indicating pins 54, canister 60 and the stowed or retracted arms 64 of the landing assembly. Also illustrated are the stowed rotor blades 30-36 all of which being retained in the stowed condition by a surrounding cylindrical shroud shown in dotted outline 70.

The deployment of the blades and the landing assembly can be easily accomplished through the removal of the shroud which maintains the stowed parts in the stowed position.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and, scope in accordance with the recitation of the appended claims.

What is claimed is:

1. Apparatus for covertly soft landing a fragile sensor with precision at predetermined target location coordinate on the surface of the earth comprising:

a fragile sensor module having an unpowered tail-rotorless autorotational mechanism mounted for rotation on the module;

a sensor deployment launching device for deploying said sensor module above said target;

a unit for receiving geopositioning signals and for outputting the realtime location of the sensor module;

a guidance unit for control of the unpowered autorotational mechanism to guide the sensor module along a trajectory from deployment point to target coordinates in response to inputs into said guidance unit from said geopositioning unit and said target location coordinates, said guidance unit upon sensor module deployment guiding said sensor module along said trajectory to said target coordinates, such that said sensor module when deployed above said predetermined target is guided by said autorotational mechanism to soft land at said target coordinates in a covert manner; and, landing apparatus for said sensor module which contacts the earth when the module lands, said landing apparatus, including a shock absorbing unit and a unit for leveling the sensor housed in said sensor module, said shock absorbing unit including a number of parallelogram frames, each hinged at the corners thereof for providing said shock absorbing said parallelogram frames having opposed short sides, one of said short sides hingedly attached to said sensor module and an opposed short side carrying a positioning pin such that when said landing apparatus is deployed said positioning pin points downwardly, said parallelogram frames assuring that all of said positioning pins are parallel one to the other for providing a stable multipoint landing structure.

2. The apparatus of claim 1, wherein said landing apparatus includes said number of parallelogram frames, said articulation permitting stowing of said landing apparatus against the module housing during initial deployment, and further including a mechanism for un-stowing said parallelogram frames prior to impact of said sensor module with the ground.

3. The apparatus of claim 1, and further including vanes on said sensor module to counter the rotation of the autorotational mechanism.

4. The apparatus of claim 1, wherein said sensor is carried by said sensor module and is retracted in a canister, said sensor being deployed out of the canister when the sensor module lands at a target.

5. The apparatus of claim 1, wherein said sensor is spaced from the terrain.

6. The apparatus of claim 5, wherein the spacing of said sensor from the terrain is maintained by said landing apparatus in combination with said leveling unit.

7. The apparatus of claim 1, and further including outwardly extending vanes on each of said parallelogram frames to oppose the rotational forces of said autorotational mechanism.

* * * * *